(12) United States Patent
Yasukochi (10) Patent No.: US 9,597,835 B2
(45) Date of Patent: Mar. 21, 2017

(54) THREE-DIMENSIONAL MODELING APPARATUS, MODEL, AND METHOD OF MANUFACTURING A MODEL

(71) Applicant: Sony Corporation, Tokyo (JP)

(72) Inventor: Hiroyuki Yasukochi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 14/812,766

(22) Filed: Jul. 29, 2015

(65) Prior Publication Data

US 2015/0328832 A1 Nov. 19, 2015

Related U.S. Application Data

(62) Division of application No. 13/467,351, filed on May 9, 2012, now Pat. No. 9,138,939.

(30) Foreign Application Priority Data

May 16, 2011 (JP) ................................ 2011-108989

(51) Int. Cl.
| | | |
|---|---|---|
| *B29C 67/00* | (2006.01) | |
| *B29L 31/00* | (2006.01) | |
| *B33Y 10/00* | (2015.01) | |

(52) U.S. Cl.
CPC ...... *B29C 67/0055* (2013.01); *B29C 67/0051* (2013.01); *B29C 67/0066* (2013.01); *B29C 67/0085* (2013.01); *B29C 67/0096* (2013.01); *B29L 2031/772* (2013.01); *B33Y 10/00* (2014.12); *Y10T 428/24802* (2015.01)

(58) Field of Classification Search
CPC ............ B29C 67/0055; B29C 67/0066; B29C 67/0085; B29C 67/0051; B29C 67/0096; B29C 41/36; B29C 41/52; B33Y 10/00
USPC ..... 264/308, 497, 494, 496, 401; 425/174.4, 425/375
See application file for complete search history.

(56) References Cited

U.S. PATENT DOCUMENTS

| | | |
|---|---|---|
| 2001/0048183 A1 | 12/2001 | Fujita |
| 2011/0101569 A1 | 5/2011 | Yasukochi |

FOREIGN PATENT DOCUMENTS

JP        2009-137048        6/2009

*Primary Examiner* — Yogendra Gupta
*Assistant Examiner* — Ninh Le
(74) *Attorney, Agent, or Firm* — DENTONS US LLP (57) ABSTRACT

A three-dimensional modeling apparatus includes: a stage; a regulating body having a surface including a linear region along a first direction and being arranged to face the stage so that the linear region of the surface comes closest to the stage; a supply nozzle configured to supply a material to be cured by energy of an energy beam to a slit region which is a region between the stage and the linear region; a movement mechanism configured to move the regulating body and the stage relative to each other along a second direction other than the first direction to form a cured layer of the material for at least one layer; and an irradiation unit configured to irradiate the material supplied from the supply nozzle to the slit region with the energy beam under a state in which the stage and the regulating body rest relative to each other.

7 Claims, 7 Drawing Sheets

THREE-DIMENSIONAL MODELING APPARATUS, MODEL, AND METHOD OF MANUFACTURING A MODEL

RELATED APPLICATION DATA

This application is a division of U.S. patent application Ser. No. 13/467,351 filed May 9, 2012, the entirety of which is incorporated herein by reference to the extent permitted by law. The present application claims the benefit of priority to Japanese Patent Application No. JP 2011-108989 filed on May 16, 2011 in the Japan Patent Office, the entirety of which is incorporated by reference herein to the extent permitted by law.

BACKGROUND

The present technology relates to a three-dimensional modeling apparatus configured to produce a three-dimensional object with use of a material to be cured by an energy beam such as light, a model produced with the three-dimensional modeling apparatus, and a method of manufacturing a model.

In related art, a modeling apparatus which produces a three-dimensional model has been known as an apparatus of rapid prototyping, and widely used for business purposes. Generally, the three-dimensional modeling apparatus produces a model on a layer-by-layer basis based on shape data of each predetermined thickness of an object to be modeled, in other words, shape data of each layer.

As an example of a main method of the three-dimensional modeling apparatus, there is stereolithography in which a photo-curable resin is partially selectively irradiated with a laser beam so that a desired part of the resin is cured and rendered, to thereby produce a model.

The stereolithography includes a free liquid surface method and a regulated liquid surface method, for example. In the free liquid surface method, under a state in which a liquid surface of the photo-curable resin is exposed to the air, rendering is performed by focusing the laser beam on an interface between the air and the liquid surface. The free liquid surface method involves a problem that stacking accuracy of the resin (accuracy of a thickness for each layer and accuracy of a surface condition of the resin for each layer) is influenced by surface accuracy of the liquid surface.

In terms of this, in the regulated liquid surface method, under a state in which the liquid surface of the photo-curable resin is regulated, for example, by a flat glass surface, rendering is performed by focusing the laser beam through the glass onto an interface between the liquid surface and the glass surface.

Japanese Patent Application Laid-open No. 2009-137048 (hereinafter, referred to as Patent Document 1) discloses a stereolithographic apparatus employing the regulated liquid surface method. The stereolithographic apparatus includes a position regulating mechanism configured to prevent deflection of the glass and maintain the glass to be flat (for example, paragraph of the description and FIGS. 7 to 10 of Patent Document 1).

SUMMARY

In the regulated liquid surface method using the glass or a film, after completion of modeling of each layer, it is necessary to peel off the cured resin from the glass. However, in proportion to a modeling area of each layer, a force necessary for peeling becomes higher. Thus, in some cases, a model collapses or the model is peeled off from a base (stage on which the model is stacked).

In view of the above-mentioned circumstances, there is a need for a three-dimensional modeling apparatus capable of cleanly peeling off a material from a regulating body. Further, there is another need for a model produced by the three-dimensional modeling apparatus, and a method of manufacturing a model.

According to an embodiment of the present technology, there is provided a three-dimensional modeling apparatus including a stage, a regulating body, a supply nozzle, a movement mechanism, and an irradiation unit.

The regulating body has a surface including a linear region along a first direction and is arranged to face the stage so that the linear region of the surface comes closest to the stage.

The supply nozzle is configured to supply a material to be cured by energy of an energy beam to a slit region which is a region between the stage and the linear region.

The movement mechanism is configured to move the regulating body and the stage relative to each other along a second direction other than the first direction to form a cured layer of the material for at least one layer.

The irradiation unit is configured to irradiate the material supplied from the supply nozzle to the slit region with the energy beam under a state in which the stage and the regulating body rest relative to each other.

The regulating body is arranged so that the linear region of the regulating body comes closest to the stage, and hence the material is irradiated with the energy beam and cured in the slit region or a region in a vicinity of the slit region. The regulating body is arranged so that the linear region of the regulating body comes closest to the stage, and hence the regulating body and the stage are moved in the second direction relative to each other. As a result, the linear region of the regulating body is moved in a manner of being separated relatively from the stage along a stacking direction of the cured layer. With this, the cured layer of the material can be cleanly peeled off from the regulating body.

The surface of the regulating body may be formed as a curved surface.

The curved surface of the regulating body may be formed to have a shape of a part of a cylindrical shape including a cylindrical surface. With this, the regulating body has a shape of a part of a cylindrical body, and hence the three-dimensional modeling apparatus can be downsized.

The regulating body may be made of a material which transmits the energy beam therethrough. With this, the irradiation unit is allowed to irradiate the material with the energy beam through the regulating body. As a result, the irradiation unit is arranged with a higher degree of freedom.

The second direction along which the movement mechanism is configured to move the regulating body and the stage relative to each other may include a direction including a vertical component.

The movement mechanism may include a scanning mechanism configured to scan the regulating body and the stage relative to each other with the energy beam along the first direction.

According to another embodiment of the present technology, there is provided a method of manufacturing a model with a three-dimensional modeling apparatus, the three-dimensional modeling apparatus including a stage and a regulating body which has a surface including a linear region along a first direction and is arranged to face the stage so that the linear region of the surface comes closest to the stage.

A material to be cured by energy of an energy beam is supplied to a slit region which is a region between the stage and the linear region.

The material supplied to the slit region is irradiated with the energy beam under a state in which the stage and the regulating body rest relative to each other.

The regulating body and the stage are moved relative to each other along a second direction other than the first direction to form a cured layer of the material for at least one layer.

According to still another embodiment of the present technology, there is provided a model to be produced by the above-mentioned manufacturing method.

As described above, according to the embodiments of the present technology, the photo-curable material can be cleanly peeled off from the regulating body.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present technology will be described with reference to the drawings.

(First Embodiment)

(Configuration of Three-Dimensional Modeling Apparatus)

Figure 1:
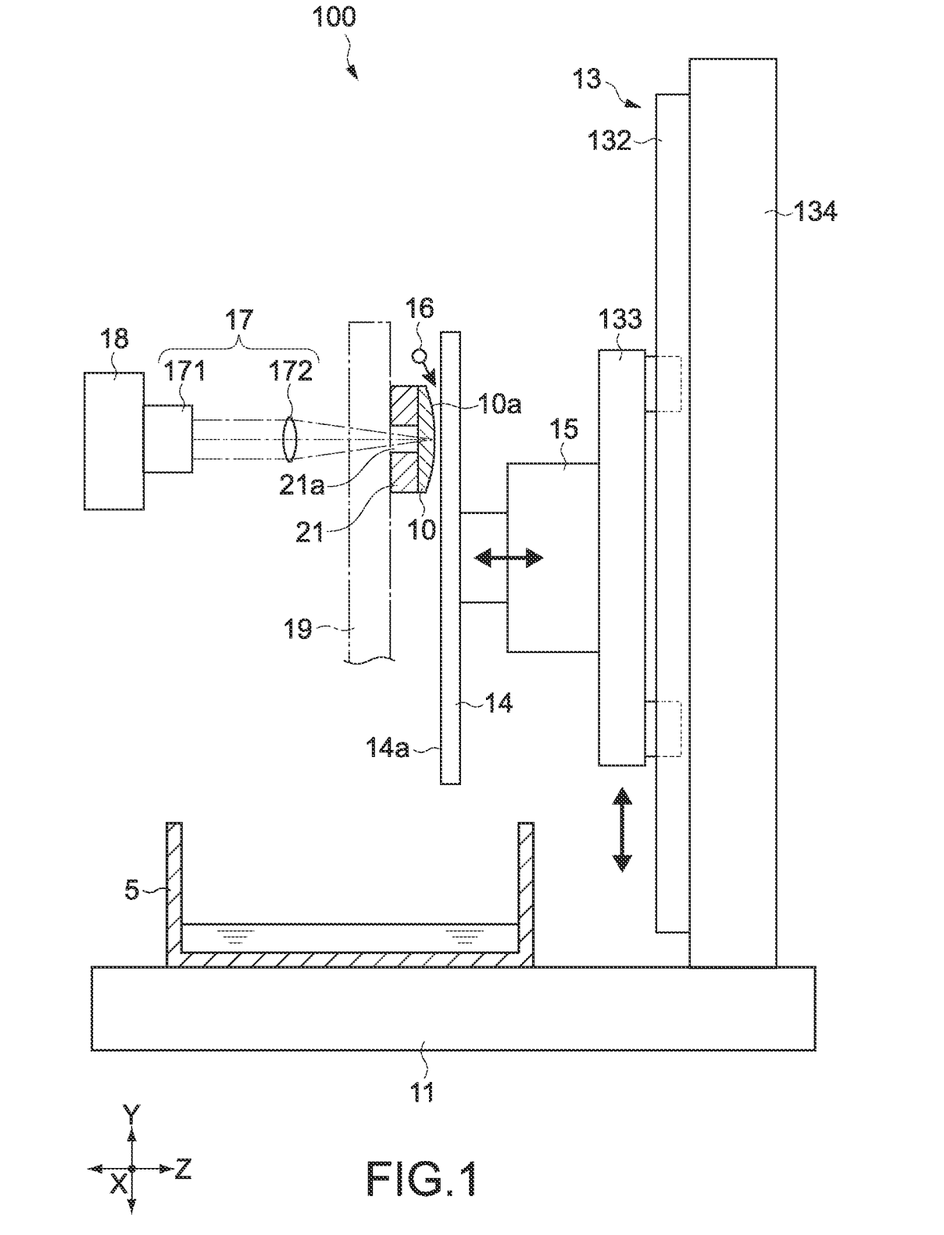
FIG. 1 is a side view of a three-dimensional modeling apparatus according to a first embodiment of the present technology.
Figure 2:
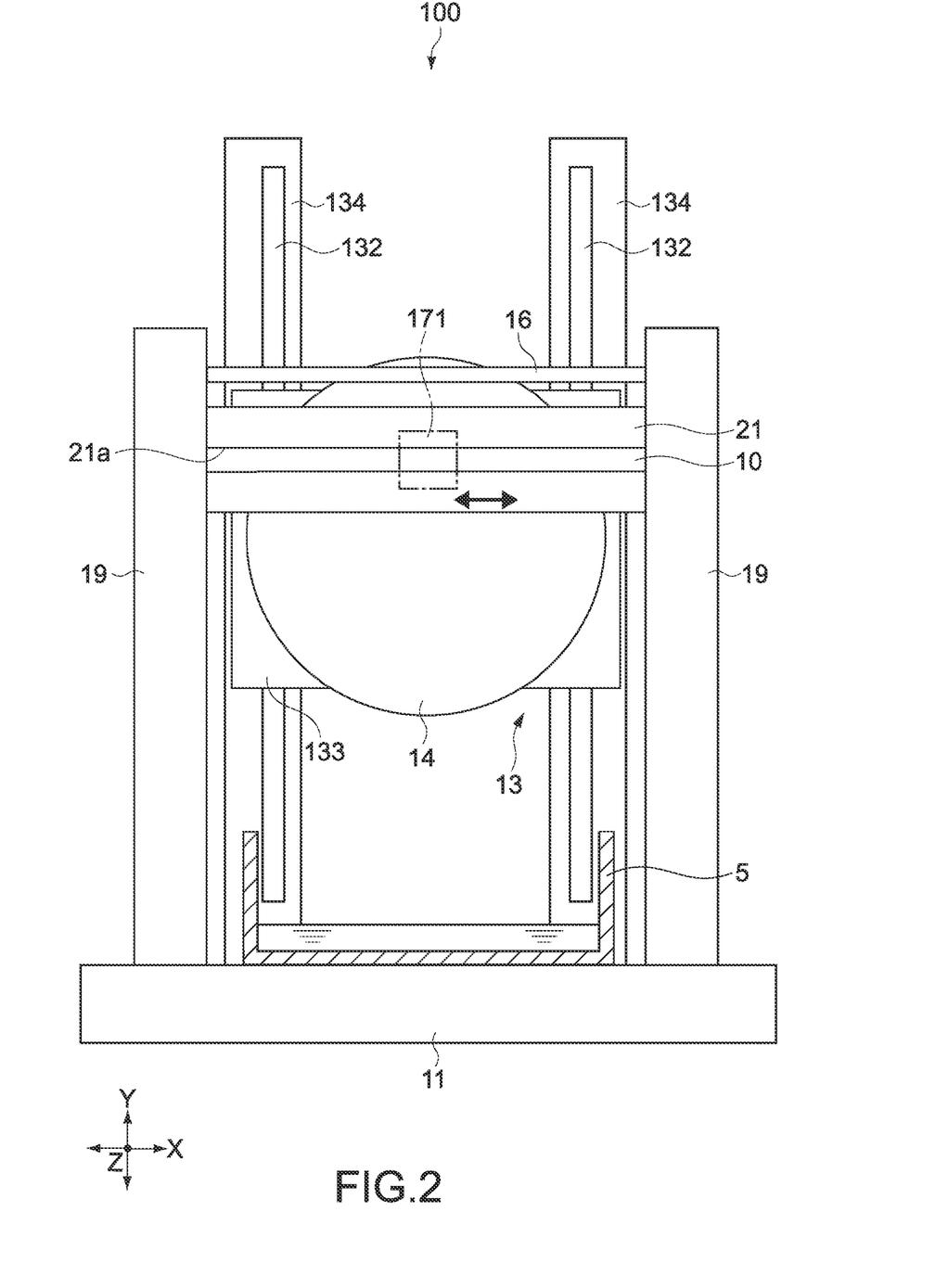
FIG. 2 is a side view of the three-dimensional modeling apparatus viewed in a Z-axis direction.
Figure 3:
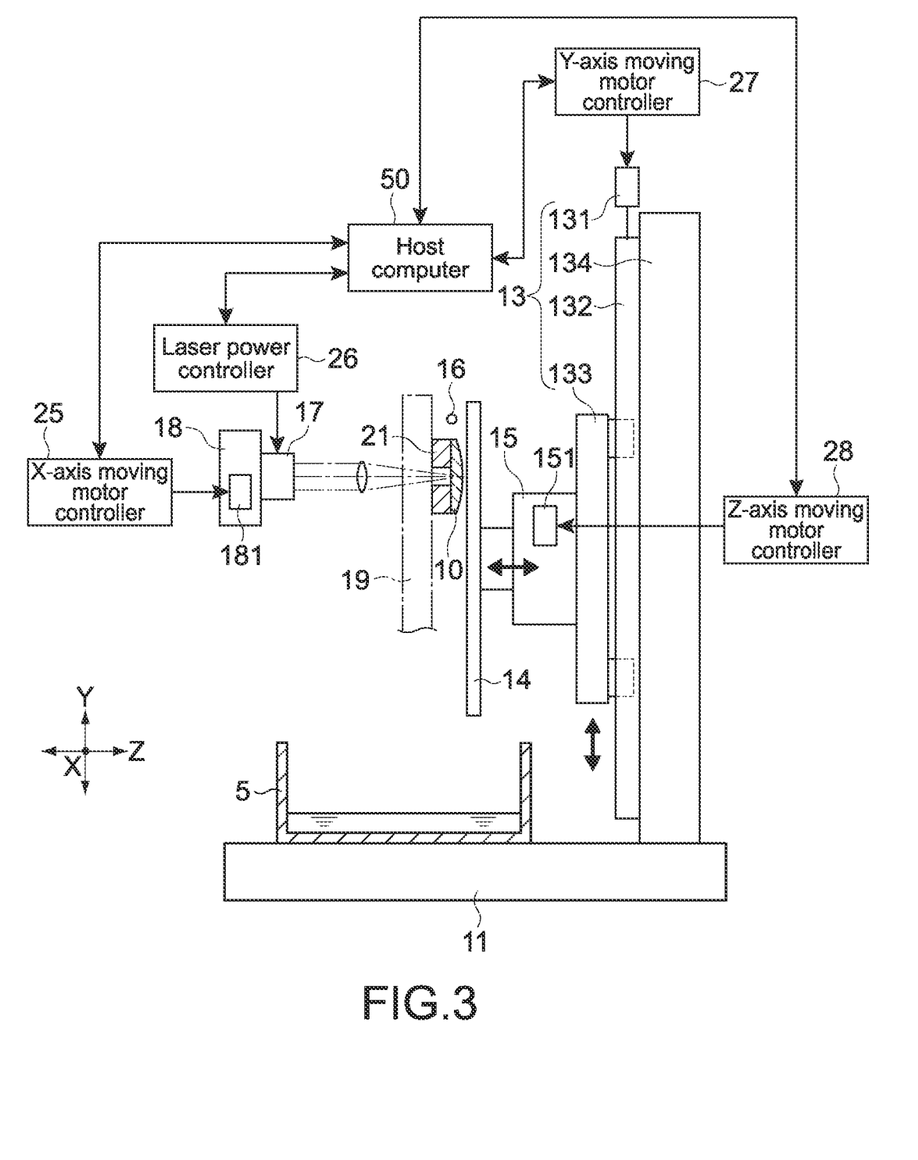
FIG. 3 is a schematic side view of the three-dimensional modeling apparatus and a block diagram showing a configuration of a control system for the three-dimensional modeling apparatus.

FIG. 1 is a side view of a three-dimensional modeling apparatus according to a first embodiment of the present technology. FIG. 2 is a side view of the three-dimensional modeling apparatus viewed in a Z-axis direction. FIG. 3 is a schematic side view of the three-dimensional modeling apparatus and a block diagram showing a configuration of a control system for the three-dimensional modeling apparatus. In those figures, the X-axis, the Y-axis, and the Z-axis are three axes orthogonal to one another.

The three-dimensional modeling apparatus 100 includes a base 11, a Y-axis movement mechanism 13 provided upright in a vertical direction with respect to the base 11, a Z-axis movement mechanism 15 connected to the Y-axis movement mechanism 13, and a stage 14 connected to the Z-axis movement mechanism 15. Further, the three-dimensional modeling apparatus 100 includes an irradiation unit 17 configured to radiate a laser beam such as an ultraviolet ray to the stage 14 as an energy beam. Still further, the three-dimensional modeling apparatus 100 includes a regulating body 10 arranged to face the stage 14, and a supply nozzle 16 configured to supply a material to be cured by the laser beam, such as a photo-curable resin, to between the stage 14 and the regulating body 10.

The Y-axis movement mechanism 13 includes a Y-axis moving motor 131 (refer to FIG. 3), support posts 134 provided upright to the base 11, guide rails 132 installed to the support posts 134 along the Y-axis direction (second direction), a moving base 133 which is connected to the guide rails 132 and can be moved along the guide rails 132 by the Y-axis moving motor 131.

The Z-axis movement mechanism 15 includes a Z-axis moving motor 151 (refer to FIG. 3) so that the stage 14 can be moved in the Z-axis direction. As illustrated in FIG. 2, although being formed, for example, in a circular shape, the stage 14 may be formed in a quadrangular shape or other shapes. The stage 14 can be moved along the Y-axis direction and the Z-axis direction by the Y-axis movement mechanism 13 and the Z-axis movement mechanism 15, respectively. The Z-axis movement mechanism 15 controls a clearance between a surface 14a of the stage 14 and a closest region of a surface 10a of the regulating body 10 with respect to the stage 14 (linear region A1 described below). Each of the Y-axis movement mechanism 13 and the Z-axis movement mechanism 15 functions as a movement mechanism.

Figure 4:
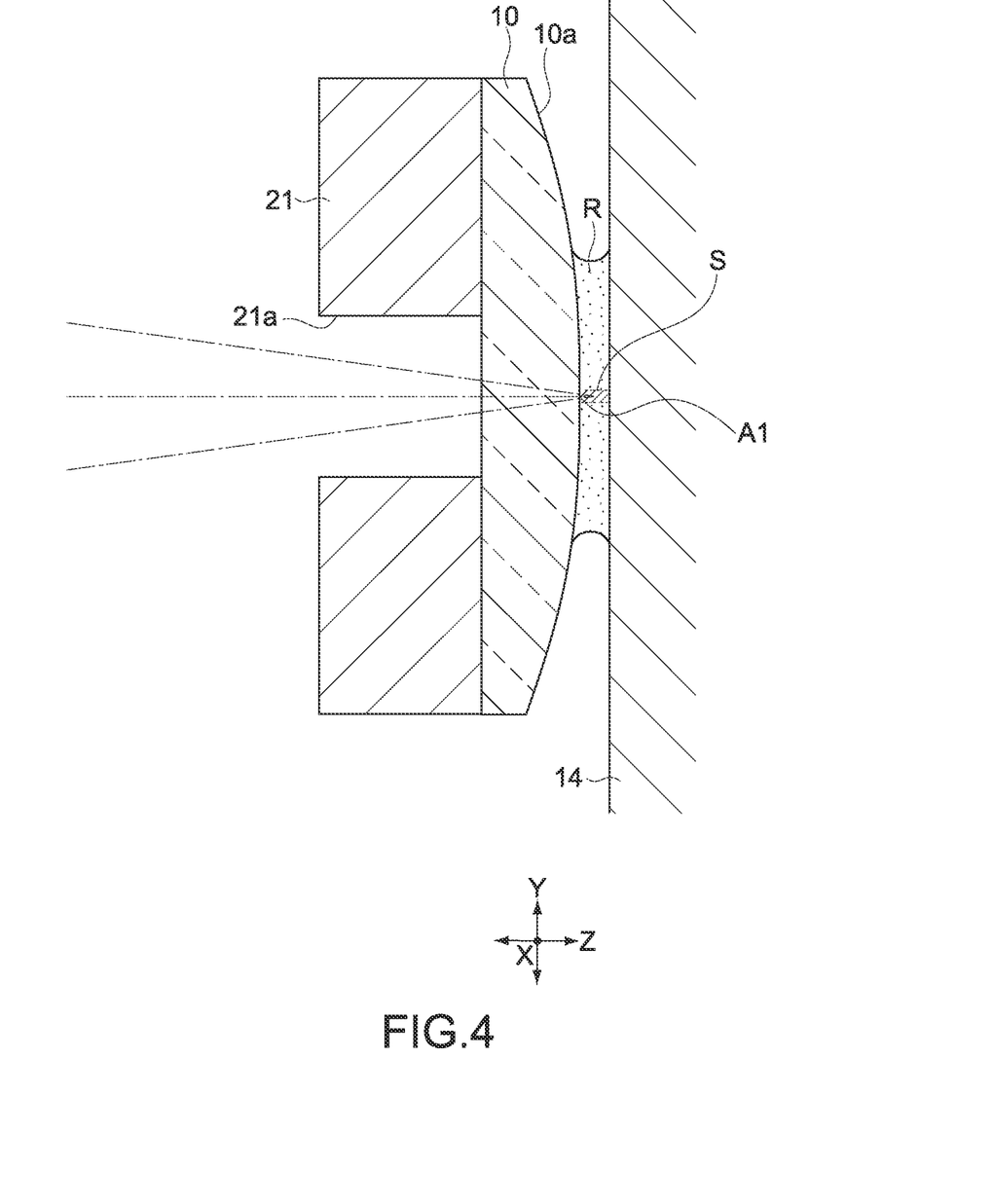
FIG. 4 is an enlarged view of a regulating body.

The regulating body 10 regulates a thickness, along the Z-axis direction, of the material supplied from the supply nozzle 16 to the surface 14a of the stage 14. FIG. 4 is an enlarged view of the regulating body 10. The regulating body 10 has a shape of a part of a cylindrical shape (cylindrical lens shape). Specifically, the surface 10a of the regulating body 10, which faces the stage 14, is a curved surface, and the curved surface is formed as a cylindrical surface.

As illustrated in FIG. 2, the regulating body 10 is formed to be long in one direction (X-axis direction). The regulating body 10 is attached to support posts 19 with use of an attachment fitting 21. The attachment fitting 21 is provided with a slit 21a formed along the X-axis direction (first direction), and the laser beam from the irradiation unit 17 is input to the regulating body 10 through the slit 21a.

The regulating body 10 is made of glass, acrylic, or other transparent materials. The regulating body 10 may be made of any material as long as the energy beam can be transmitted at a predetermined transmission rate. The surface 10a of the regulating body 10 may be coated with a film which increases a contact angle of the material, specifically, with a hydrophobic film (such as fluorine film).

The stage 14 can be arranged by the Z-axis movement mechanism 15 so that, as illustrated in FIG. 4, a slit region S is formed between the stage 14 and the surface 10a of the regulating body 10. When the surface 14a of the stage 14 and the linear region A1 along the X-axis direction, which is the closest part of the surface 10a of the regulating body 10 with respect to the stage 14, face each other, the slit region S is formed. The linear region A1 corresponds to a part of the surface 10a of the regulating body 10.

A width of the linear region A1 in the Y-axis direction ranges from 0.1 mm to 1 mm. Further, a spot diameter of the laser beam radiated from the irradiation unit 17 described below ranges from 1 μm to 100 μm. However, the width of the linear region A1 and the spot diameter can be appropriately changed in accordance with a size of the regulating body 10, a size of a model, modeling accuracy, and the like, in other words, can take other values out of these ranges.

The supply nozzle 16 has a long shape along the X-axis. The supply nozzle 16 is arranged above the regulating body 10 and attached to the support posts 19, for example, with support members (not shown). As the supply nozzle 16, it is possible to use a nozzle of a type that has a plurality of holes (not shown) configured to discharge a photo-curable material R (refer to FIG. 4) along a longitudinal direction of the nozzle. Alternatively, as the supply nozzle 16, it is also possible to use a nozzle of a slit coating type that has a slit provided along a longitudinal direction of the nozzle.

Note that, a pump, a pipe, an on/off valve, and the like (not shown) configured to introduce the photo-curable material R to the supply nozzle 16 are connected to the supply nozzle 16.

As illustrated in FIG. 1, the irradiation unit 17 includes a laser light source 171 and an objective lens 172 configured to reduce a beam spot of a laser beam emitted from the laser light source 171. The laser light source 171 and the objective lens 172 are integrally held by a holder (not shown). Through the regulating body 10, the objective lens 172 focuses on the photo-curable material R existing in the slit region S or the photo-curable material R existing in both the slit region S and a vicinity of the slit region S. In other words, the objective lens 172 is arranged at a position on an optical axis, at which a focal point of the laser beam matches at least the photo-curable material R in the slit region S.

When the laser beam generated by the irradiation unit 17 is an ultraviolet ray, an ultraviolet-curable resin is used instead of the photo-curable material R.

Further, in addition to the above-mentioned movement mechanisms, there is provided an X-axis movement mechanism (scanning mechanism) 18 provided with an X-axis moving motor 181 (refer to FIG. 3) configured to integrally move the irradiation unit 17 along the X-axis direction. The X-axis movement mechanism 18 enables the irradiation unit 17 to perform a scan with the laser beam emitted from the laser light source 171 along the X-axis direction.

Note that, a polygon scanner or a galvanometer scanner may be used as the X-axis movement mechanism.

The slit 21a of the above-mentioned attachment fitting 21 is formed to be long along the X-axis direction. Thus, the X-axis movement mechanism 18 is capable of inputting the laser beam to the regulating body 10 through the slit 21a at the time of a scan with the laser beam.

The Z-axis movement mechanism 15, the Y-axis movement mechanism 13, and the X-axis movement mechanism 18 can be formed, for example, of a ball screw drive mechanism, a rack and pinion drive mechanism, or a belt drive mechanism.

On the base 11, a waste liquid tank 5 is provided below the stage 14. The waste liquid tank 5 pools, for example, surplus photo-curable material having been discharged from the supply nozzle 16 and flown down the stage 14.

Note that, although two support posts 134 and two support posts 19 are provided (refer to FIG. 2), there may be provided one support post 134 and one support post 19 at a substantially central position of the base 11 in the X-axis direction.

As illustrated in FIG. 3, the three-dimensional modeling apparatus 100 includes a Z-axis moving motor controller 28 configured to control drive of the Z-axis moving motor 151, a Y-axis moving motor controller 27 configured to control drive of the Y-axis moving motor 131, and an X-axis moving motor controller 25 configured to control drive of the X-axis moving motor 181. Further, the three-dimensional modeling apparatus 100 includes a laser power controller 26 configured to control power of the laser beam emitted from the laser light source 171. Operations of those controllers 25 to 28 are collectively controlled by a host computer 50. Although not shown, the three-dimensional modeling apparatus 100 also includes controllers configured to drive the pump, the on/off valve, and the like connected to the supply nozzle 16.

The host computer 50 includes a CPU (Central Processing Unit), a RAM (Random Access Memory), a ROM (Read Only Memory), and the like. Instead of the CPU, there may be used a PLD (Programmable Logic Device) such as an FPGA (Field Programmable Gate Array) or an ASIC (Application Specific Integrated Circuit). The controllers 25 to 28 are each configured in hardware or software.

Typically, the host computer 50 and the controllers 25 to 28 are connected to each other in a wired manner. In this context, at least one of those controllers may be connected in a wireless manner to a control system in the three-dimensional modeling apparatus 100.

(Operation of Three-Dimensional Modeling Apparatus)

Figure 5A:
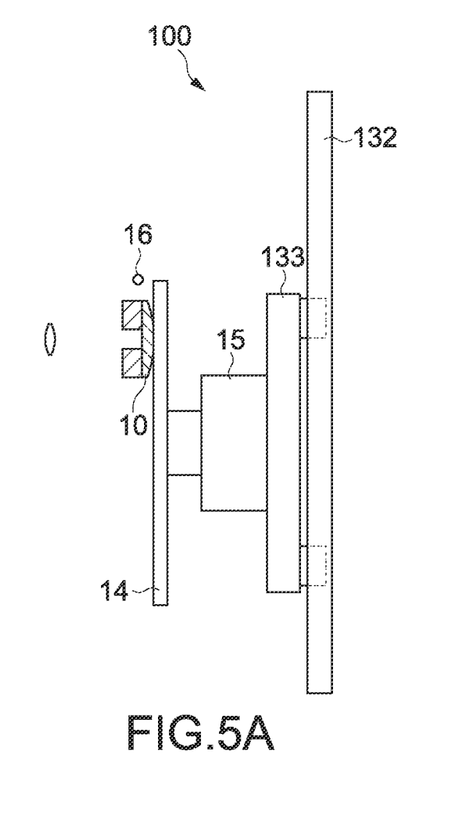
FIGS. 5A to 5C sequentially illustrate operation of the three-dimensional modeling apparatus.
Figure 5B:
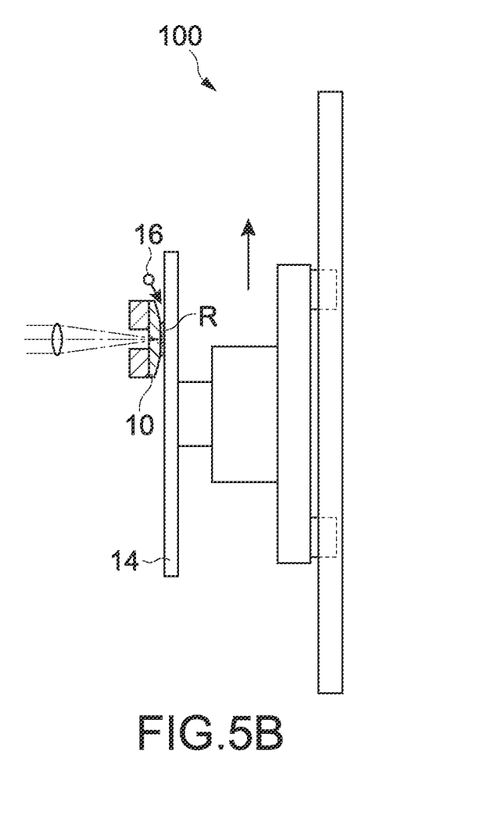
Figure 5C:
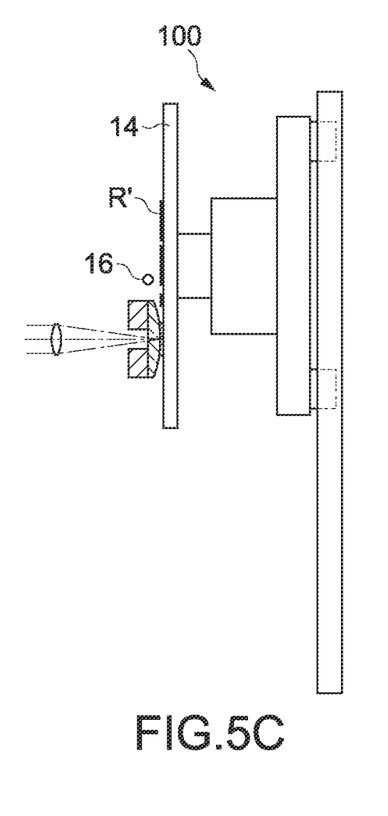

Next, description is made of operation of the three-dimensional modeling apparatus 100 configured as described above. FIGS. 5A to 5C sequentially illustrate the operation of the three-dimensional modeling apparatus 100. FIGS. 6A to 6D each illustrate, on an enlarged scale, a region between the regulating body 10 and the stage 14 during the operation.

FIG. 5A illustrates a stationary state of the three-dimensional modeling apparatus 100, specifically, a state in which the moving base 133 is at an initial position. Before actually performing modeling, a thickness of one cured layer of the photo-curable material R is set through intermediation of the host computer 50. Then, for example, when the Z-axis movement mechanism 15 driven in accordance with control from the Z-axis moving motor controller 28 brings the stage 14 into contact with the linear region A1 which is a closest part of the regulating body 10 with respect to the stage 14 (refer to FIG. 5A), a height position of the stage 14 at that time point is set as an original point in the Z-axis direction.

Note that, a position of the stage 14 in the Y-axis direction under a state in which the original point has been thus set can be appropriately set.

When the original point is set, the stage 14 is spaced apart from the regulating body 10 by a preset amount corresponding to the thickness of one cured layer of the photo-curable material R.

After the stage 14 is spaced apart from the regulating body 10, the stage 14 is moved by the Y-axis movement mechanism 13 to a modeling start portion, which is a predetermined position as illustrated in FIG. 5B. The modeling start portion is such a position of the stage 14 in a direction along the Y-axis that the slit region S can be formed between the stage 14 and the linear region A1 of the regulating body 10. As long as the stage 14 is positioned to form the slit region S, setting of the modeling start position can be appropriately changed in accordance with a size, in the Y-axis direction, of a model to be produced.

When the stage 14 is positioned to the modeling start position, the photo-curable material R is discharged from the supply nozzle 16 and flows down into between the regulating body 10 and the stage 14 by its own weight. In this way, at least the slit region S is filled with the photo-curable material R. The photo-curable material R is held between the regulating body 10 and the stage 14 by surface tension. In other words, the regulating body 10 regulates a liquid surface of the photo-curable material R with the linear region A1 in a one-dimensional region along the X-axis direction. FIG. 4 illustrates a state of the slit region S and a state of a periphery thereof on an enlarged scale. In such a state, radiation of the laser beam to the photo-curable material R, in other words, exposure is started.

First, the irradiation unit 17 radiates a laser beam. Specifically, the laser beam generated from the laser light source 171 passes through the objective lens 172 and the regulating body 10, and then is input to the photo-curable material R in the slit region S. While being moved in a direction along the X-axis by control from the X-axis moving motor controller 25, the irradiation unit 17 performs selective exposure to the photo-curable material R based on data of one row in one layer in the X-axis direction of a target to be modeled and under control by the laser power controller 26 (refer to FIG. 6A).

Figure 6A:
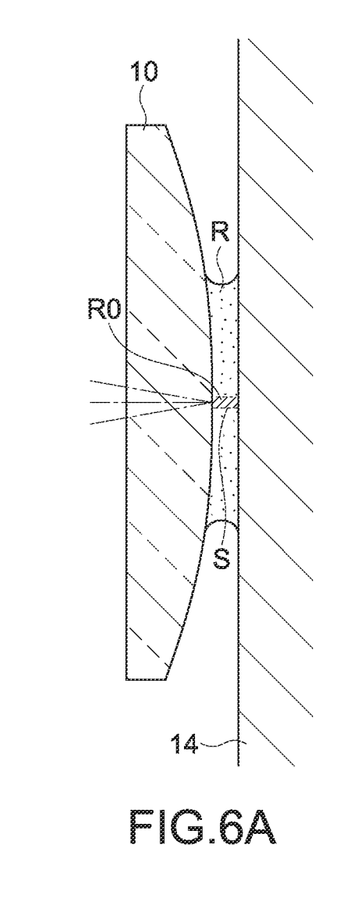
FIGS. 6A to 6D each illustrate a region between the regulating body and a stage during the operation on an enlarged scale.

Specifically, the laser power controller 26 generates a modulation signal with respect to laser power in accordance with the data of one row of the model, and sends the signal to the laser light source 171. In this way, a part of the photo-curable material R, which corresponds to one row in the X-axis direction in one layer, is selectively exposed and cured. In other words, at least a part of the photo-curable material R, which exists in the slit region S, is exposed. During the exposure with radiation of the laser beam, the stage 14 is stopped.

Although ranging from 1 μm to 100 μm, the thickness of the one layer of the model is not limited to this range, and can be appropriately set.

In this way, as illustrated in FIG. 6A, a cured object R0 corresponding to one row is formed.

Figure 6B:
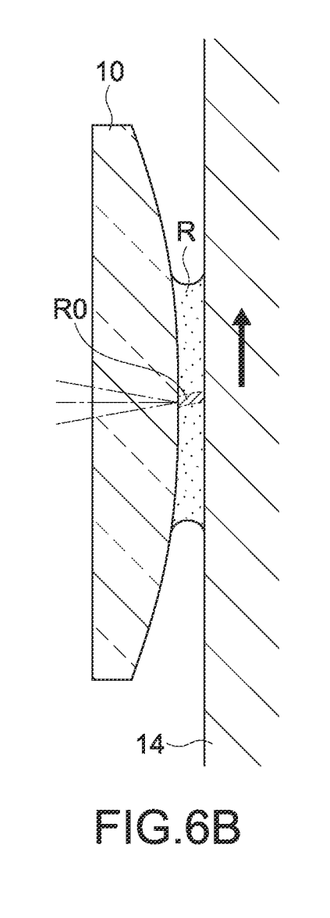
Figure 6C:
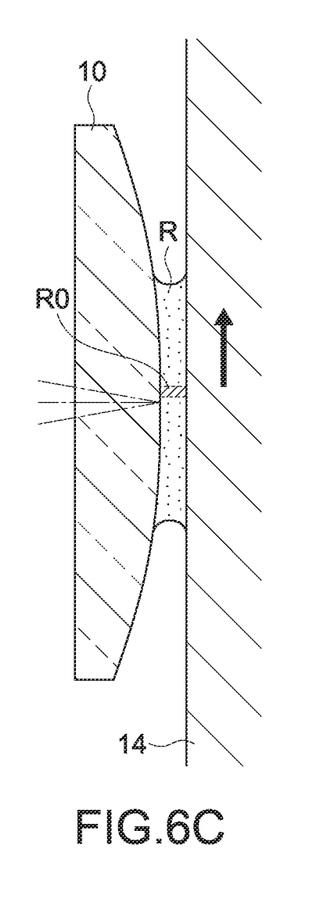
Figure 6D:
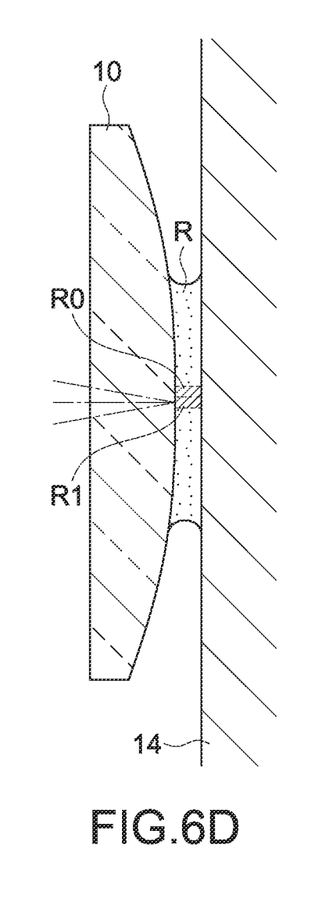

When the exposure for one row of the photo-curable material R along the X-axis direction is completed, the laser beam radiation operation is stopped. Then, the moving base 133 is moved by the Y-axis movement mechanism 13 so that the stage 14 is moved by a predetermined pitch to a rear side in a direction along the Y-axis (upper side of FIG. 5B). At this time, as illustrated in FIGS. 6B and 6C, the cured object R0 is moved together with the stage 14, and in accordance therewith, a shearing force is generated between the regulating body 10 and the cured object R0. As a result, the regulating body 10 and the cured object R0 are peeled off from each other. As described above, since the hydrophobic film is formed on the surface of the regulating body 10, the peeling can be more easily performed.

Then, selective exposure on next one row in the first layer (one row adjacent to the first row) is performed in the same manner as described above (refer to FIG. 6D). In this way, a cured object R1 corresponding to the next row is formed.

The three-dimensional modeling apparatus 100 repeats the scanning radiation of the laser beam along the X-axis direction and a stepwise feed of the stage 14 along the Y-axis direction as described above. With this, as illustrated in FIG. 5C, a selective cured layer of the photo-curable material R, which corresponds to one layer, in other words, a cured layer R' corresponding to one layer is formed. In this way, an exposure process for one layer is performed in a manner of what is called raster scan.

Although being influenced by the spot diameter of the laser beam, in other words, resolution at the time of producing a model, the pitch of such intermittent movement of the stage 14 in the direction along the Y-axis can be appropriately set.

After the exposure for one layer onto the photo-curable material R has been completed, the stage 14 is moved further apart from the regulating body 10 in the Z-axis direction. By repeating the operation described hereinabove, the cured layer R' is stacked. In this way, a model of an intended shape is produced.

As described above, the surface 10a of the regulating body 10 is formed as a cylindrical surface such that the linear region A1 of the regulating body 10 comes closest to the stage 14. Thus, when the stage 14 is moved along the Y-axis direction, the linear region A1 of the regulating body 10 is moved gradually apart relatively from the stage 14 along the Z-axis direction. With this, the shearing force is generated as described above, and hence the cured objects (for example, R0 and R1 illustrated in FIGS. 6B and 6D) of the material can be cleanly peeled off from the regulating body.

A regulated liquid surface method in related art involves a problem that flatness of a model is deteriorated by a warp of a film or a glass surface. As a countermeasure, in this embodiment, the surface of the regulating body 10 is formed to have a shape of a cylindrical surface, and hence a liquid surface of the photo-curable material is regulated with the linear region A1. Thus, even when the regulating body 10 is subjected to a contractile force generated at the time when the photo-curable material R is cured, the regulating body 10 is less liable to be deformed or warped. Further, the regulating body 10 is prevented from being deformed by viscosity of the photo-curable material R prior to exposure. With this, flatness of the cured layer can be increased, and a thickness of the cured layer can be controlled with high accuracy.

In this embodiment, the liquid surface of the photo-curable material is regulated with the linear region A1. Thus, even with use of a resin material of high viscosity, a model can be produced with an accurate layer thickness. As a result, a material to be used is selected from a wider range of options.

In the regulated liquid surface method in related art, it takes a long time for a step of peeling off a model from a film or a glass surface. However, in this embodiment, in the exposure process, the model is peeled off from the regulating body 10 at each stepwise feed of the stage 14 in the direction along the Y-axis. In other words, the exposure process for one layer and the peeling process overlap in time period each other, and hence a time period for producing a model can be saved.

In this embodiment, in the linear region A1 of the regulating body 10, the regulating body 10 is intermittently (at each stepwise feed along the Y-axis direction) peeled off by a minute amount from the stage 14. Thus, peeling can be performed with a small force, and hence the cured objects are prevented from being damaged. In other words, the cured objects are easily peeled off from the regulating body 10. Meanwhile, although peeling can be performed with a small force as described above, the cured objects are not peeled off from the stage 14.

The regulating body 10 according to this embodiment has a shape of a part of a cylindrical body. Thus, in comparison with a case where the regulating body 10 is formed of a cylindrical body, the regulating body 10 can be downsized, which leads to downsizing of the three-dimensional modeling apparatus 100 as a whole.

The regulating body 10 according to this embodiment is capable of transmitting a laser beam therethrough, and hence the irradiation unit 17 is allowed to irradiate the photo-curable material R with a laser beam through the regulating body 10. In contrast, for example, when the stage is made of a material which transmits a laser beam therethrough and there is provided an irradiation unit configured to radiate the laser beam through the stage, it is necessary to arrange the irradiation unit on the Z-axis movement mechanism side. In comparison with such a mode, the irradiation unit 17 according to this embodiment is arranged with a higher degree of freedom.

(Second Embodiment)

Figure 7:
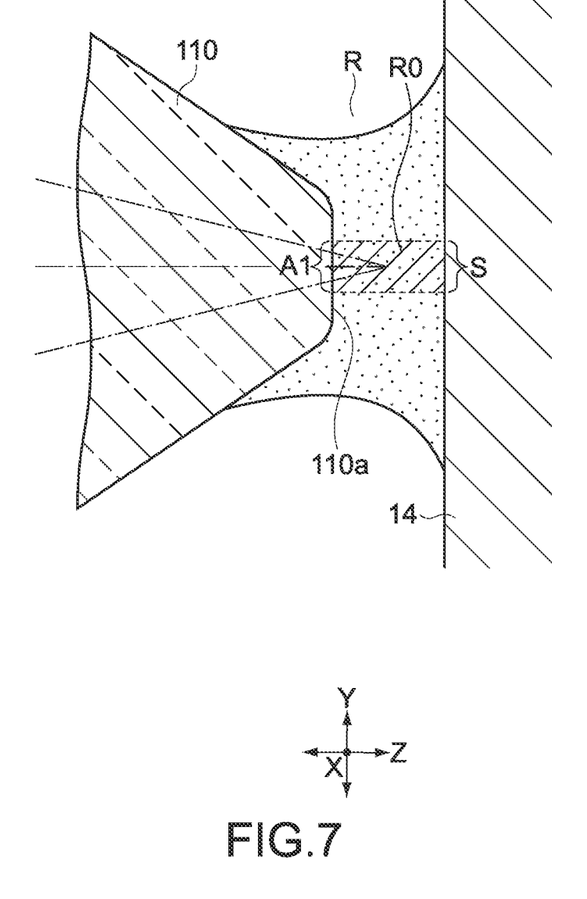
FIG. 7 is an enlarged view of a regulating body according to a second embodiment of the present technology.

FIG. 7 is an enlarged view of a part and a periphery of a regulating body according to a second embodiment of the present technology. In the following, description of the same members, functions, and the like as those of the three-dimensional modeling apparatus 100 according to the above-mentioned embodiment is simplified or omitted, and description is made mainly of differences.

A regulating body 110 in this embodiment has a surface 110a which is narrower than the surface 10a of the above-mentioned regulating body 10 and faces the stage 14. The surface 110a includes the linear region A1 of the regulating body 110, and the slit region S is formed between the regulating body 110 and the stage 14.

The surface 110a of the regulating body 110 is formed in a substantially flat shape. A width of the surface 110a of the regulating body 110 along the Y-axis direction is not particularly limited as long as the width is larger than a diameter of a laser beam for exposure on the surface 110a. For example, the width of the surface 110a is set to be approximately two to five times as large as a width of the linear region A1 along the Y-axis direction.

The three-dimensional modeling apparatus 100 including such a regulating body 110 also has the same functions and advantages as those of the three-dimensional modeling apparatus 100 according to the above-mentioned first embodiment.

Note that, an amount of an uncured part of the material R around the cured object R0 is smaller than an amount of an uncured part of the material R in the above-mentioned first embodiment. In this case, it suffices that a supply cycle of the material R from the supply nozzle 16 is set to be shorter than a supply cycle in the above-mentioned first embodiment.

(Other Embodiments)

The present technology is not limited to the embodiments described hereinabove, and is carried out in other various embodiments.

The above-mentioned three-dimensional modeling apparatuses may each further include a washing nozzle configured to supply a washing material to a model to be produced on the stage 14. With this, the washing material is discharged from the washing nozzle toward the model, and the model, that is, a surface of the cured layer can be cleansed. As a result, modeling accuracy is enhanced. The washing nozzle may include a jet type nozzle configured to jet washing liquid, and a nozzle of a type of running down washing liquid from above toward the cured layer.

Instead of the single supply nozzle 16, there may be provided a plurality of supply nozzles 16. In that case, the plurality of supply nozzles 16 may discharge materials of different types or materials of the same type but different in color.

In the above-mentioned embodiments, during modeling, the regulating body 10 (or 110) rests and the stage 14 is moved in the Z-axis direction. However, this should not be construed restrictively. For example, in the Z-axis direction, the regulating body 10 (or 110) may be moved and the stage 14 may rest, or both of those components may be moved.

In the above-mentioned embodiments, the stage 14 is moved in the vertical direction in order to form the cured layer for one layer of a model. However, the regulating body and the stage may be moved relative to each other in a horizontal direction in order to form the cured layer for the one layer of the model, or may be moved relative to each other in a direction which is other than the vertical direction but has a component in the vertical direction, in other words, in an oblique direction.

In the above-mentioned embodiments, the direction in which the regulating body 10 (or 110) and the stage 14 are moved relative to each other (second direction) in order to form the cured layer for one layer of a model is a direction orthogonal to the direction in which the linear region A1 of the regulating body extends (first direction). However, the second direction is not particularly limited as long as the second direction is other than the first direction. For example, the second direction may include a direction oblique to the first direction.

In the above-mentioned embodiments, the regulating body 10 (or 110) and the stage 14 rest in the X-axis direction, and the irradiation unit 17 is moved along the X-axis direction. Conversely, the irradiation unit may rest, and the regulating body and the stage may be integrally moved in the X-axis direction.

The material for the model is not limited to the photo-curable material, and may include a material to be cured by thermal energy, electron beams, or ultrasonic waves. Further, in accordance with the material, an energy beam radiated from the irradiation unit 17 can be appropriately changed. Examples of the energy beam include an ultraviolet ray, an infrared ray, visible light, an electron beam, a heat ray, and an ultrasonic wave. The heat ray may include an ultraviolet ray, and in this case, the curing process is performed by spot heating with an infrared laser. The heat ray, the ultrasonic wave, and the like may be used in a case of producing a model that can be produced with relatively low modeling accuracy.

The material for the regulating body is not limited to a material which transmits energy beams therethrough at a predetermined transmission rate, and may include any material. When the regulating body is made of a material which does not transmit energy beams therethrough, for example, the stage may be made of a material which transmits energy beams therethrough, and the energy beams may be radiated from the side of the stage opposite to the side on which the regulating body is arranged.

The three-dimensional modeling apparatuses according to the above-mentioned embodiments each produce a model by stacking two or more cured layers. However, the three-dimensional modeling apparatus may produce a thin model by forming a cured layer for at least one layer. Such a thin model is used, for example, as a film or a filter.

By performing an appropriate coating process such as plating on the produced model, the model can be used not as a model of a design target but as an actual structure. This technology is applicable not only to the thin model but also to the model having two or more cured layers as in the above-mentioned embodiments.

At least two of the features in the embodiments described hereinabove may be combined with each other.

The present technology may employ the following configurations.

(1) A three-dimensional modeling apparatus, including:

a stage;

a regulating body which has a surface including a linear region along a first direction and is arranged to face the stage so that the linear region of the surface comes closest to the stage;

a supply nozzle configured to supply a material to be cured by energy of an energy beam to a slit region which is a region between the stage and the linear region;

a movement mechanism configured to move the regulating body and the stage relative to each other along a second direction other than the first direction to form a cured layer of the material for at least one layer; and an irradiation unit configured to irradiate the material supplied from the supply nozzle to the slit region with the energy beam under a state in which the stage and the regulating body rest relative to each other.

(2) The three-dimensional modeling apparatus according to Item (1), in which the surface of the regulating body is formed as a curved surface.

(3) The three-dimensional modeling apparatus according to Item (2), in which the curved surface of the regulating body is formed to have a shape of a part of a cylindrical shape including a cylindrical surface.

(4) The three-dimensional modeling apparatus according to any one of Items (1) to (3), in which the regulating body is made of a material which transmits the energy beam therethrough.

(5) The three-dimensional modeling apparatus according to any one of Items (1) to (4), in which the second direction along which the movement mechanism is configured to move the regulating body and the stage relative to each other is a direction including a vertical component.

(6) The three-dimensional modeling apparatus according to any one of Items (1) to (5), in which the movement mechanism includes a scanning mechanism configured to scan the energy beam relative to the regulating body and the stage along the first direction.

(7) The three-dimensional modeling apparatus according to any one of Items (1) and (4) to (6), in which the surface of the regulating body is formed as a flat surface.

(8) A model to be produced with a three-dimensional modeling apparatus, the three-dimensional modeling apparatus including a stage, and a regulating body which has a surface including a linear region along a first direction and is arranged to face the stage so that the linear region of the surface comes closest to the stage, the model being produced by:

supplying a material to be cured by energy of an energy beam to a slit region which is a region between the stage and the linear region;

irradiating the material supplied to the slit region with the energy beam under a state in which the stage and the regulating body rest relative to each other; and moving the regulating body and the stage relative to each other along a second direction other than the first direction to form a cured layer of the material for at least one layer.

(9) A method of manufacturing a model with a three-dimensional modeling apparatus, the three-dimensional modeling apparatus including a stage, and a regulating body which has a surface including a linear region along a first direction and is arranged to face the stage so that the linear region of the surface comes closest to the stage, the method including:

supplying a material to be cured by energy of an energy beam to a slit region which is a region between the stage and the linear region;

irradiating the material supplied to the slit region with the energy beam under a state in which the stage and the regulating body rest relative to each other; and moving the regulating body and the stage relative to each other along a second direction other than the first direction to form a cured layer of the material for at least one layer.

The present disclosure contains subject matter related to that disclosed in Japanese Priority Patent Application JP 2011-108989 filed in the Japan Patent Office on May 16, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method of manufacturing a model with a three-dimensional modeling apparatus, the three-dimensional modeling apparatus including (a) a stage with a planar surface extending in x and y axes directions, and (b) a regulating body which has a surface including a linear region along x axis direction and is arranged to face the planar surface of the stage so that the linear region of the surface of the regulating body comes closest to the planar surface of the stage, the method comprising: supplying a material to be cured by energy of an energy beam to a slit region which is a region between the stage and the linear region;

irradiating the material supplied to the slit region with the energy beam under a state in which the stage and the regulating body rest relative to each other; and moving the regulating body and the stage relative to each other along the y axis direction and a z axis direction to form a cured layer of the material for at least one layer, wherein the y axis direction is a vertical direction with respect to gravity, and excess curable material is permitted to fall along the y axis direction and be captured in a wasted container with an open top oriented orthogonal to the planar surface of the stage.

2. The method of claim 1, wherein the surface of the regulating body is formed as a curved surface.

3. The method of claim 2, wherein the curved surface of the regulating body is formed to have a shape of a part of a cylindrical shape including a cylindrical surface.

4. The method of 1, wherein the regulating body is made of a material which transmits the energy beam therethrough.

5. The method of claim 1, wherein the regulating body is moved along the x and y axes directions and the stage is moved along the z axis direction.

6. The method of claim 1, wherein the three-dimensional modeling apparatus includes a movement mechanism that includes a scanning mechanism configured to scan the regulating body and the stage relative to each other with the energy beam along the x axis direction.

7. The method of claim 1, wherein the surface of the regulating body is formed as a flat surface.

* * * * *